May 18, 1965
W. E. GUNDELFINGER
3,184,570
PLUG-TYPE DETACHABLE THERMOSTATIC-TIMER
CONTROL UNIT FOR COOKING UTENSILS
Filed Jan. 11, 1961
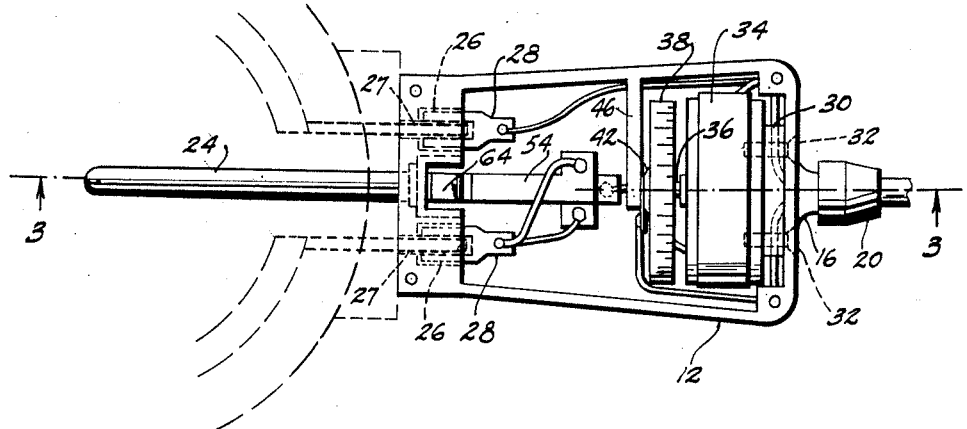
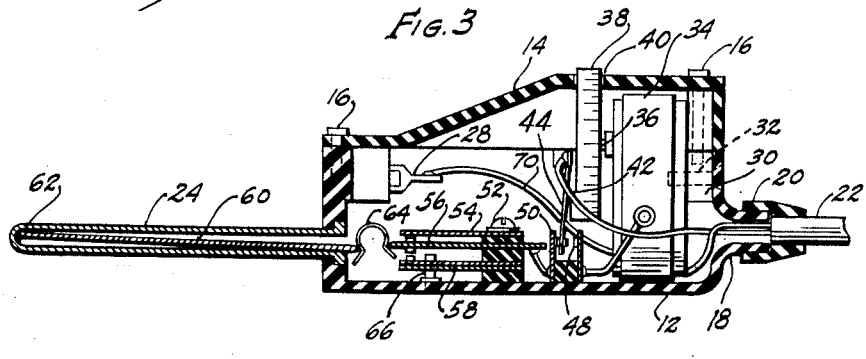
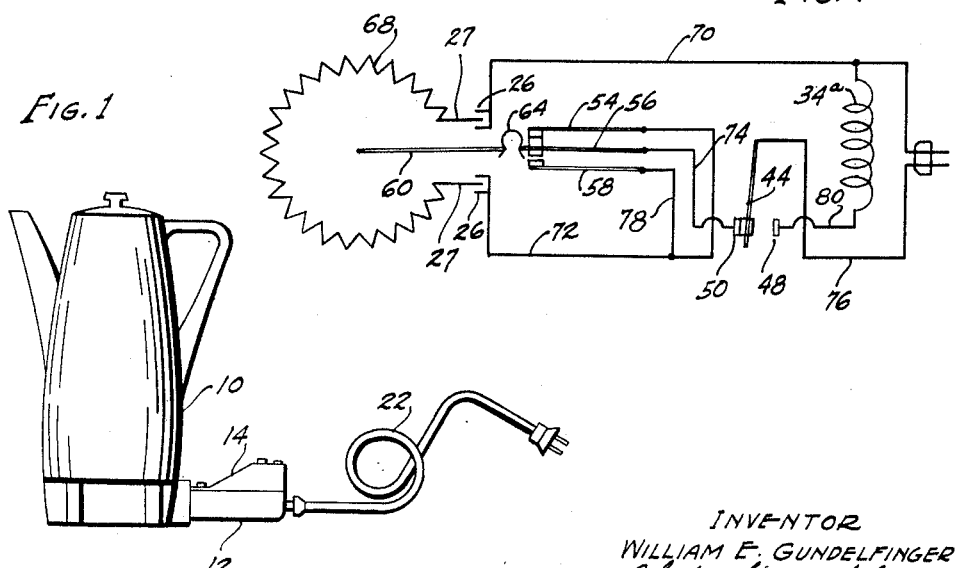
INVENTOR
WILLIAM E. GUNDELFINGER
BY Charles E. Markham
HIS AGENT 3,184,570
PLUG-TYPE DETACHABLE THERMOSTATIC-TIMER CONTROL UNIT FOR COOKING UTENSILS
William E. Gundelfinger, House Springs, Mo., assignor, by mesne assignments, to White-Rodgers Company, a corporation of Missouri
Filed Jan. 11, 1961, Ser. No. 82,071
2 Claims. (Cl. 200—136.5)

This invention relates to connector plugs for cooking utensils having electric heating elements and particularly to a connector plug incorporating automatic time and temperature control mechanism.

The primary object of the invention is to provide a plug-in control unit for electrically heated cooking utensils including time measuring and temperature responsive means whereby the time of initiation of a cooking or heating cycle may be preselected and the temperature automatically controlled.

A further object of the invention is to provide a plug-in control unit for electrically heated cooking utensils incorporating a synchronous, motor-type, timing device operating on the same alternating power supply as the utensil heating element.

Further objects and advantages will appear from the following description when read in connection with the accompanying drawing in which:

FIG. 1 is a side elevation of a controlling connector plug constructed in accordance with the present invention and shown in operative association with an electrically heated coffee percolator;

FIG. 2 is a top plan view (with cover removed) of the connector plug shown in FIG. 1;

FIG. 3 is a longitudinal sectional view of the controlling connector plug taken on line 3—3 of FIG. 2; and FIG. 4 is a diagrammatic view of the components and circuit connections of the controlling connector plug.

In FIG. 1 of the drawing the controlling connector plug is shown operatively associated with an electrically heated coffee percolator 10 and the operation of the device will be described in such association by way of illustration of its utility. The control plug as hereinafter described, or as it may be modified within the spirit of the invention as hereinafter set forth in the appended claims, may, however, be utilized to control the operation of any other electrically heated cooking utensil and such other utility is contemplated.

Referring to details of construction, shown in FIGS. 2 and 3, an open top casing of rigid, molded, dielectric material is indicated by the numeral 12. A removable top cover member 14 of preferably similar material is attached to the casing by screws 16. The casing 12 is provided at its right-hand end (with reference to FIGS. 2 and 3) with a perforated cylindrical extrusion 18, through which electrical leads pass, and a perforated cap member 20 which is fitted over the extrusion 18 and receives the end of a two-wire, flexible cord 22. Projecting from the left-hand end of the casing 12 is a tubular, metal, probe member 24, the inner end of which is open and communicates with the interior of the casing 12 while the outer end thereof is closed. The probe 24 is rigidly attached in the end wall of casing 12 by inserting the metal probe into the mold in which the casing member is molded. Also at the left-hand end of the casing 12 and on opposite sides of the probe 24 are conductive socket members 26 which receive terminal prongs 27 which project from the cooking utensil 10 whereby the control plug is detachably connected to the cooking utensil both mechanically and electrically. The conductive socket members 26 are also rigidly fixed in the end wall of the molded casing 12 by insert molding. The conductive socket members 26 have portions 28 which project into the interior of the casing and provide terminal posts for the attachment of electrical leads.

Mounted on a boss 30 within the casing 12 and attached thereto by screws 32 is a geared, synchronous motor driven, timing device 34 having a take-off shaft 36 on which is frictionally mounted for normal rotation therewith a flat, circular, cam member 38. The circular cam member 38 is arranged so that a portion of its periphery extends exteriorly of the casing through a slot 40 in the cover member 14 to permit convenient rotation of the cam member. The cam member 38 has a lobe 42 on one face thereof arranged to engage a resilient switch contact arm 44 which is fixed at one end on an interiorly projecting casing boss 46. The flexible contact arm 44 carries contacts on the free end thereof which alternately engage opposed fixed contacts 48 and 50, and the arm is so formed as to normally close with fixed contact 48.

Mounted within the casing and attached to the lower wall thereof by a screw 52 is a switching device comprising an upper, relatively rigid, switch arm 54 carrying at its free end a stationary contact, an intermediate, flexible, switch arm 56 carrying movable contacts on opposite sides of the free end thereof, and a lower, relatively rigid, bimetallic, switch arm 58 carrying a stationary contact at its free end. Within the tubular probe 24 and extending the full length thereof is a bimetallic strip 60 which is suitably fixed at one end to the inner wall of the closed end of the probe 24 as by soldering at 62. The bimetallic strip 60 is somewhat longer than the probe tube 24 so that its free end projects slightly into the interior of casing 24 in general alignment with and spaced from the end of intermediate, flexible, switch blade 56. The free ends of bimetallic strip 60 and switch blade 56 are each formed with a knife edge, which edges enter V notches formed in the legs of a generally U-shaped spring member 64. The arrangement is such that as the free end of bimetallic strip 60 is moved up or down sufficiently, relative to the end of flexible switch arm 56, so that these elements pass through an aligned position, a snap action is imparted to the switch blade 56. The bimetallic strip 60 is so constructed that it warps in such manner with increasing temperature as to cause its free end to move upward.

The lower, bimetallic switch arm 58 is constructed so that the free end thereof warps downward with increasing temperature so as to separate the contact on the end thereof from the contact on flexible switch arm 56. The switch arm 58 is also constructed in such manner with respect to its dimensions and the resistivity of the material that, when it is in circuit, it will be heated sufficiently by the passage of current therethrough to effect its warping sufficiently to separate its contact from that on switch arm 56. The downward movement of switch arm 56 is limited by stop pin 66.

Referring to the diagram, FIG. 4, an electrical resistance heater for heating the percolator is indicated at 68, connected at its ends to terminal prongs 28 which enter socket members 26. When the switch arm 44 is moved to closed circuit position with contact 50 due to engagement therewith of cam lobe 42, and when the contacts on switch arms 54 and 56 are in closed circuit position, all as shown, the resistance heater 68 is connected through a lead 70 to one side of a power source into which the two-wire cord 22 has been plugged and it is connected to the other side thereof through a lead 72, switch arm 54, switch arm 56, a lead 74, switch arm 44, and a lead 76. When switch arm 56 is moved downward into engagement with switch arm 58 by the action of thermostatic strip 60, this same side of the heater 68 is connected to the power source through a lead 78 and switch arm 58 instead of through switch arm 54.

When cam member 38 is rotated to any other position in which the cam lobe does not engage switch arm 44, the switch arm will, due to its resiliency and form, engage the contact 48. Under these conditions the percolator heating element circuit will be broken at contact 50, and a circuit for the motor winding 34a of the synchronous motor timing device 34 will be completed through lead 76, switch arm 44, contact 48, a lead 80, the motor winding, and the lead 70. Thus, it will be seen that when circular cam member 38 is in such position that the cam lobe 42 thereon engages switch arm 44 to separate switch arm 44 from contact 48 and engage it with contact 50, the timer motor winding 34a will be de-energized and the percolator heating element will be energized, but when the circular cam member is in any other angular position, a circuit for winding 34a is completed and the timer is therefore operative provided, of course, extension cord 22 is plugged into an A.C. power source.

The exact position of circular cam member 38, which effects disconnection of the synchronous motor and completion of the percolator heater circuit, is indicated by means of indicia on the peripheral surface of the cam member and by an index arrow (not shown) on the casing cover 14. The indicia on the periphery of the cam member consist of hourly divisions and fractions thereof which are designated 0 to 12, zero position being the position in which cam lobe 42 engages the switch arm 44. A gear train between the motor armature shaft and take-off shaft 36 reduces the rotational speed of the take-off shaft to one revolution in twelve hours, operating on a sixty cycle, A.C. power source. The torque due to gear reduction at the take-off shaft 36 is sufficient to permit relative manual rotation of the frictionally connected cam member and the frictional resistance of the connection of cam member 38 to the take-off shaft is adequate to actuate the switch arm without any slippage.

*In operation*

At normal room temperature or below, the bimetallic strip 60 and bimetallic switch arm 58 will be in the positions shown and contact arms 54 and 56 will be in closed circuit position. Under these conditions, when it is desired to immediately initiate a coffee-making cycle, the extension cord 22 is plugged into a source of power, the controlling connector plug is plugged to the coffee percolator, and the cam wheel 38 is turned so as to register zero with the index mark on the cover. The timer motor winding is now disconnected at 48 so that no rotation of the cam wheel occurs, and the percolator heater circuit is completed at this time through switch arms 54 and 56. The connection of the controlling connector plug with the percolator places the probe tube in suitable heat exchange relationship with the utensil so that the temperature of the probe and the bimetallic strip 60 therein varies in some predetermined relationship with the liquid in the percolator.

When the liquid in the percolator attains a temperature at which it has been determined that sufficient percolation has occurred, the bimetal strip 60 responds in a manner to move its free end upward sufficiently to pass an aligned position with flexible switch arm 56 and thereby effects due to the resiliency of U-shaped spring element 64, a snap action downward movement of switch arm 56 to break its contact with that of arm 54 and make contact with bimetal switch arm 58. When this occurs the percolator heater circuit is completed through the bimetal switch arm 58. The flow of current through bimetal arm 58 for a predetermined period causes it to warp downward and separate its contact from that of switch arm 56.

This breaks the circuit for the percolator heater and permits the bimetal switch arm 58 to cool and re-engage its contact with that of switch arm 56, whereupon it will again be heated by the current passing therethrough. The making and breaking of the percolator heater circuit will continue thus and will result in maintaining some predetermined, lower, desired temperature of the coffee in the percolator as long as the connector plug extension cord is plugged into a power source.

When the arm 56 is snapped downward by action of the bimetal strip 60, it engages a stop 66 which limits its downward travel so that it does not follow the warping bimetal arm 58. It is to be understood that the temperature change required to develop sufficient warping stress in bimetal strip 60 to move it through center with switch arm 56 against spring element 64 and snap the switch arm 56 from upper to lower positions or vice versa is in the order of 80°. Therefore, if the temperature of cut-off at which switch 56 is snapped downward is 180° Fahrenheit and the bimetal strip 58 is designed to make and break its circuit at such intervals which will maintain the coffee at 140° Fahrenheit, the arm 56 will remain in the downward position because the bimetal strip 60 will not cool sufficiently under these conditions to snap it upward.

When it is desired to initiate a coffee-making cycle at some future time, the circular cam mber 38 is merely rotated so as to register the number of hours hence that it is to occur. When this preselected time has elapsed the percolator heater will be constantly energized through the switch arms 54 and 56 and the timer motor will automatically stop and remain in zero position. Thereafter, when the coffee-percolating cycle is complete, the coffee will be maintained at some preselected lower temperature indefinitely by the "off" and "on" action of the current-heated switch arm 58.

The foregoing description is intended to be illustrative and not limiting, the scope of the invention being set forth in the appended claims.

I claim:

1. In a controlling connector plug for detachable connection with an electrically heated utensil, a hollow casing, a pair of socket terminals at one end of said casing adapted to receive prong terminals on a utensil for the mechanical and electrical connection of the plug to the utensil, a temperature sensing probe attached and extending from said one end of said casing for sensing the temperature of a utensil, and said probe including a member having a free end extending into said casing and movable in response to utensil temperature change, a flexible extension cord attached to the other end of said casing for connection with an A.C. power source, a synchronous timer motor in said casing and a circular cam rotated by said motor through a frictional driving connection, first and second switches in said casing, said first switch being a double throw switch having a double throw blade engageable by said cam when in a predetermined angular position, and said first switch having a first normally biased throw position when not engaged by said cam and a second throw position to which it is moved when engaged by said cam, said second switch being engaged by said free end of said probe member and having a cold position and a hot position, a main circuit in said casing connecting said socket terminals with said extension cord and including in series arrangement when completed said first switch when in its second throw position to which it is moved by said cam and said second switch when in its cold position, and a parallel circuit branch in said casing for energizing said synchronous motor including when completed said first double throw switch when in its normally biased throw position, and said casing having a slot opening in one wall thereof and said circular cam having a portion of its periphery projecting exteriorly of said casing through said opening to facilitate the selective positioning of said frictionally driven cam.

2. A connector plug as set forth in claim 1 in which said second switch is a double throw switch comprising a double throw blade engaged by said free end of said probe member, a fixed stationary contact which is engaged by said blade when in its cold position and an opposite stationary contact which is intermittently engaged by said blade when in its hot position, said opposite stationary contact being mounted on the free end of a bimetal strip and connected therethrough to the same side of said main circuit as said fixed stationary contact, and said bimetal strip being arranged to warp in a direction to move said opposite stationary contact away from said blade to break said main circuit when heated by current passing therethrough and to subsequently move toward said blade upon cooling, and stop means to limit the movement of said double throw blade toward its hot position.

References Cited by the Examiner

UNITED STATES PATENTS

| | | | |
|---|---|---|---|
| 1,677,361 | 7/28 | Mottlau | 200—136.3 |
| 1,708,619 | 4/29 | Hart | 200—38 |
| 1,745,420 | 2/30 | Hewitt | 219—491 |
| 2,313,065 | 3/43 | Halloran | 200—38 |
| 2,525,463 | 10/50 | Spooner et al. | 219—493 |
| 2,956,136 | 10/60 | Schwaneke. | |

FOREIGN PATENTS 1,045,285  6/53  France.

BERNARD A. GILHEANY, *Primary Examiner.*

RICHARD M. WOOD, ROBERT K. SCHAEFER,
*Examiners.*